US007545777B2

(12) United States Patent
Ariyoshi et al.

(10) Patent No.: US 7,545,777 B2
(45) Date of Patent: **\*Jun. 9, 2009**

(54) CDMA COMMUNICATION SYSTEM AND METHOD

(75) Inventors: Masayuki Ariyoshi, Mitaka (JP); Nobukazu Doi, Hachioji (JP); Tesshin Shiga, Kodaira (JP); Yoshito Ohta, Tokorozawa (JP)

(73) Assignees: Hitachi Communication Technologies, Ltd., Tokyo (JP); Hitachi Denshi Kabushiki Kaisha, Tokyo (JP)

( * ) Notice: Subject to any disclaimer, the term of this patent is extended or adjusted under 35 U.S.C. 154(b) by 1257 days.

This patent is subject to a terminal disclaimer.

(21) Appl. No.: 10/456,577

(22) Filed: Jun. 9, 2003

(65) Prior Publication Data

US 2003/0214932 A1 Nov. 20, 2003

Related U.S. Application Data

(63) Continuation of application No. 09/550,807, filed on Apr. 18, 2000, now Pat. No. 6,597,676, which is a continuation of application No. 09/314,302, filed on May 19, 1999, now Pat. No. 6,137,786, which is a continuation of application No. 08/888,603, filed on Jul. 7, 1997, now Pat. No. 5,930,244.

(30) Foreign Application Priority Data

Jul. 9, 1996 (JP) .................................. 8-178935

(51) Int. Cl.
 *H04B 7/216* (2006.01)
(52) U.S. Cl. ........................ 370/335; 375/260; 370/342
(58) Field of Classification Search ................. 370/328, 370/335, 342, 227, 310, 441; 375/140, 226, 375/260–264, 356, 358
See application file for complete search history.

(56) References Cited

U.S. PATENT DOCUMENTS 4,460,992 A 7/1984 Gutleber (Continued)

FOREIGN PATENT DOCUMENTS

EP 673130 9/1995

(Continued)

OTHER PUBLICATIONS

Proakis, J.G., "Digital Communications", McGraw-Hill, London.

(Continued)

*Primary Examiner*—Thai D Hoang
(74) *Attorney, Agent, or Firm*—Mattingly & Malur, P.C.

(57) ABSTRACT

In CDMA communications, a base station detects a difference between a reference phase of a spreading code and a phase of a received signal of each terminal station, and feeds a phase jump signal PJ-i representative of the phase difference back to each terminal station. After timing acquisition, the reception operation is performed using the reference phase, and a shift amount between the phase of a received signal and the reference phase is fed back to each terminal station as phase synchronization control information PC-i. Each terminal station coarsely adjusts the phase of the spreading code in accordance with the phase jump signal PJ-i, and thereafter finely adjusts the phase of its transmitting signal in accordance with the phase synchronization control information PC-i. It is therefore possible to synchronize the phases of the signals transmitted from terminal stations and received at the base station. Accordingly, an orthogonal code is used for spreading on the reverse links.

8 Claims, 11 Drawing Sheets

U.S. PATENT DOCUMENTS

| | | | |
|---|---|---|---|
| 5,103,459 A | 4/1992 | Gilhousen et al. | |
| 5,111,478 A | 5/1992 | McDonald | |
| 5,228,053 A | 7/1993 | Miller et al. | |
| 5,235,615 A | 8/1993 | Omura | |
| 5,267,260 A | 11/1993 | Lee | |
| 5,499,236 A | 3/1996 | Giallorenzi et al. | |
| 5,533,012 A | 7/1996 | Fukasawa et al. | |
| 5,583,853 A | 12/1996 | Giallorenzi et al. | |
| 5,617,410 A | 4/1997 | Matsumoto | |
| 5,619,492 A | 4/1997 | Press et al. | |
| 5,652,764 A | 7/1997 | Kanzaki et al. | |
| 5,663,956 A | 9/1997 | Schilling | |
| 5,675,608 A | 10/1997 | Kim et al. | |
| 5,691,974 A | 11/1997 | Zehavi et al. | |
| 5,694,388 A | 12/1997 | Sawahashi et al. | |
| 5,703,874 A | 12/1997 | Schilling | |
| 5,737,329 A * | 4/1998 | Horiguchi | 370/342 |
| 5,764,630 A | 6/1998 | Natali et al. | |
| 5,781,451 A | 7/1998 | Schneider | |
| 5,822,363 A | 10/1998 | Le Roy | |
| 5,898,697 A | 4/1999 | Hurme et al. | |
| 5,930,244 A * | 7/1999 | Ariyoshi et al. | 370/335 |
| 5,983,113 A * | 11/1999 | Asanuma | 455/506 |
| 6,091,703 A | 7/2000 | Saunders et al. | |
| 6,101,175 A | 8/2000 | Schorman et al. | |
| 6,137,786 A * | 10/2000 | Ariyoshi et al. | 370/335 |
| 6,597,676 B1 * | 7/2003 | Ariyoshi et al. | 370/335 |

FOREIGN PATENT DOCUMENTS

| | | |
|---|---|---|
| JP | 5-048570 | 2/1993 |
| JP | 05-175937 | 7/1993 |
| JP | 5-219010 | 8/1993 |
| JP | 5-219011 | 8/1993 |
| JP | 5-327655 | 10/1993 |
| JP | 06-252885 | 9/1994 |
| JP | 7-254867 | 3/1995 |
| JP | 7-177126 | 7/1995 |
| JP | 07-297760 | 11/1995 |
| JP | 8-84132 | 3/1996 |

OTHER PUBLICATIONS

J. Proalis and M. Salehi, Communication Systems Engineering, Prentice-Hall, Inc., 1994, pp. 857-863.

* cited by examiner

CDMA COMMUNICATION SYSTEM AND METHOD

This is a continuation application of U.S. Ser. No. 09/550,807, filed Apr. 18, 2000 now U.S. Pat. No. 6,597,676, which is a continuation application of U.S. patent application Ser. No. 09/314,302, filed May 19, 1999, now U.S. Pat. No. 6,137,786, which is a continuation application of U.S. Ser. No. 08/888,603, filed Jul. 7, 1997, now U.S. Pat. No. 5,930,244.

BACKGROUND OF THE INVENTION

1. Field of the Invention

The present invention relates to a communication system using CDMA (Code Division Multiple Access) and a control method of tracking the phases of spreading codes.

2. Description of the Related Art

CDMA is used for multiplexing a plurality of communication channels on the same frequency band by using a plurality of different spectrum spreading codes.

A base station spreads a transmitting signal to each terminal station by multiplying the transmitting signal by a spreading code specific to each communication channel, and transmits a multiplexed signal in the form of a plurality of mixed spread signals of communication channels by using a single carrier frequency. Each terminal station de-spreads a received signal by multiplying the reception signal by the code (de-spreading code) specific to its communication channel which is the same as the spreading code used by the base station, to thereby derive only a correlated signal of its channel. In this case, other channel signals are not correlated and become noise components because different spreading codes and de-spreading codes are used. The level of noise components can be lowered to a degree not to interfere with communications.

Attention has been paid to CDMA as a method of considerably improving the use efficiency of communication frequencies. CDMA has been adopted in the U.S.A. as a standard (IS-95) of digital cellular mobile communication systems and is now in practical use in this nation. The IS-95 standard uses orthogonal codes as spreading codes on a forward link for signal transmission from the base station to each terminal station.

Examples of the orthogonal codes are shown in FIG. 11 being indicated at W0, W1, W2 and W3. An orthogonal code has the nature that a sum of products of two arbitrary codes in a code group within an orthogonal unit becomes zero.

FIG. 10 shows a radio communication system including of a plurality of base stations 401 (401-1 to 401-j) interconnected by a wired network and a plurality of terminal stations 402 (402-1 to 402-n) distributed within a communication area of each base station. According to the IS-95 standard, the base station assigns specific orthogonal codes Wi (i=1 to n) to a plurality of terminal stations (or communication channels) within the communication area of the base station. The base station spreads a signal or data destined for a terminal station i with an orthogonal code Wi specific to the terminal station and transmits it. The terminal station de-spreads the received signal with the orthogonal code Wi specific to it so that signal components of all other channels are removed during the de-spreading process and they do not become interference signals.

Such communication systems, which use spectrum spreading with orthogonal codes for communications from a base station to terminal stations over forward links, are disclosed, for example, in U.S. Pat. No. 5,103,459.

In order to utilize the advantages of orthogonal codes, it is necessary to ensure perfect synchronization of orthogonal code timings between a subject reception channel and other reception channels during the de-spreading process. If there is any shift of timings of orthogonal codes on a plurality of multiplexed channels, orthogonality is lost so that received signal components of other reception channels become interference signals relative to the signal of the subject reception channel and its signal-to-noise (S/N) ratio is degraded.

Even if each terminal station spreads transmitting data by using orthogonal codes, the transmitting signal of each channel is received asynchronously at the base station because each terminal station transmits it independently over the reverse link. Therefore, the transmitting signals of respective channels become interference signals and a reception S/N ratio is degraded. Orthogonal codes without synchronization used as spreading codes as in the above case limit the number of connection channels. For example, in order to realize a reception S/N ratio of 10 dB, the number of connection channels via reverse links becomes about one tenth of the number of forward links.

For the above reason, a conventional CDMA communication system uses orthogonal codes only for one-to-N transmission links in order to easily synchronize timings of orthogonal codes between channels, i.e., only for forward links from a base station to terminal stations. For N-to-one transmission reverse links over which a plurality of terminal stations transmit signals independently, non-orthogonal codes such as pseudo-noise (PN) codes have been used for spreading transmission signals.

JP-A-7-254867 discloses a CDMA communication system in which a base station feeds a delay information on the channel back to a mobile terminal station, but does not refer to use of an orthogonal code therein.

SUMMARY OF THE INVENTION

An object of the present invention is to provide a CDMA communication system and method capable of receiving good quality signals at both base and terminal stations.

Another object of the present invention is to provide a CDMA communication system and a control method of tracking the phases of spreading codes, capable of increasing the number of terminal stations accessible to the base station at the same time.

The present invention is applied to a CDMA communication system comprising a base station (main station) and a plurality of terminal stations (subsidiary stations), the base station providing a plurality of channels to forward and reverse links through CDMA (code division multiple access) and each terminal station being provided in correspondence with each channel constituted of a pair of forward and reverse links.

In order to achieve the above objects, in one aspect of the present invention, the base station feeds information, which indicates a phase difference between a phase of a received signal detected at each channel on a reverse link and a reference phase of a de-spreading code at said base station, back to the corresponding terminal station via the corresponding forward link of the channel. Each terminal station synchronizes a phase of a spreading code of a transmitting signal on the reverse link with the reference phase at the base station, in accordance with the phase difference information received at the corresponding forward link of the channel. Therefore, an orthogonal code can be used as the spreading code of a transmission signal for both the reverse and forward links.

More specifically, according to the aspect of the invention, a reception circuit of each terminal station is provided with an orthogonal generator. The phase of an orthogonal code generated by the orthogonal generator is controllable in accordance with phase synchronization control information received from the base station on the forward link. Each channel signal on the reverse link can therefore be received at the base station in an orthogonal state.

In order to synchronize the phases of orthogonal codes of respective terminal stations, the base station measures, for example, a phase difference between the reception reference phase and the phase of a reception signal of each terminal station, at each channel on the reverse link. A phase synchronization control signal generated in accordance with the measured phase difference is fed back to each terminal station. Each terminal station derives the phase synchronization control signal of its own from the signal sent from the base station, and in accordance with this derived control signal, the phase of the orthogonal code for the transmitting signal is controlled.

According to another aspect of the invention, when a terminal station is additionally connected, the measurement results of the reception phase at the base station are supplied to the terminal station. In accordance with the measurement results, the terminal station sets the phase of the spreading code for the transmission signal to a predetermined phase.

The foregoing and other objects, advantages, manner of operation and novel feature of the present invention will be understood from the following detailed description when read in conjunction with the accompanying drawings.

DETAILED DESCRIPTION OF THE PREFERRED EMBODIMENTS

Figure 10:
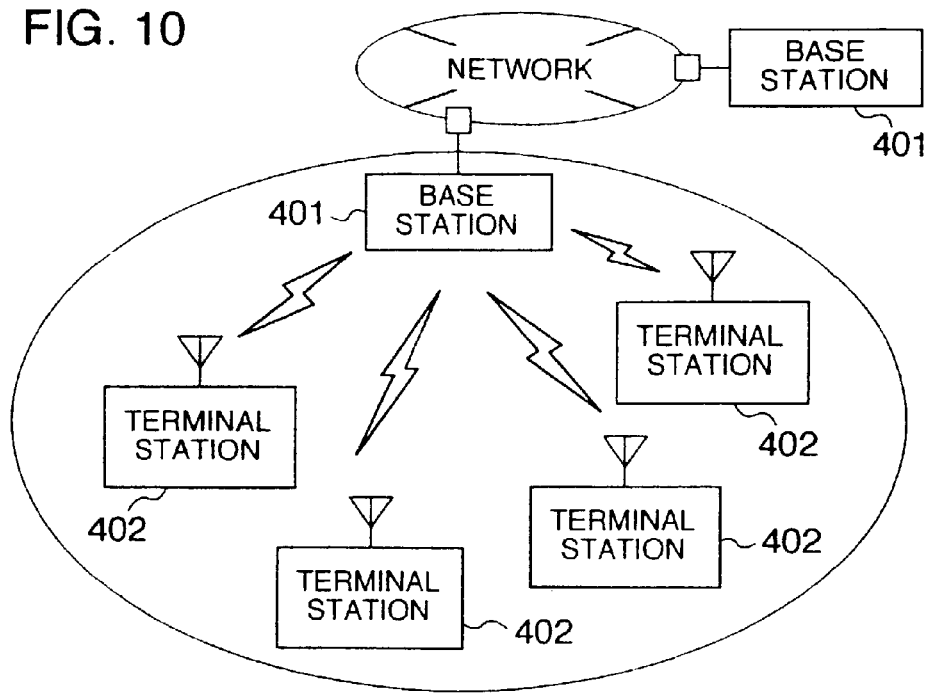
FIG. 10 is a diagram showing a communication system to which the invention is applied.
Figure 11:
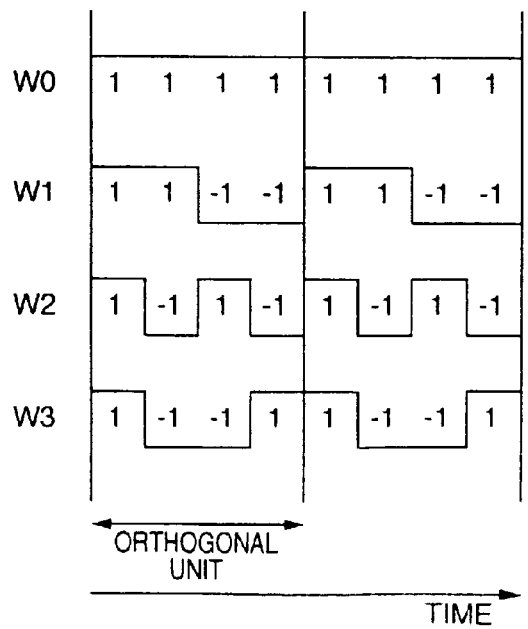
FIG. 11 is a diagram showing examples of orthogonal codes used for spectrum spreading.

Embodiments of the invention will be described, by taking a radio communication system constituted of base stations 401 and terminal stations 402 as shown in FIG. 10 as an example.

Figure 1:
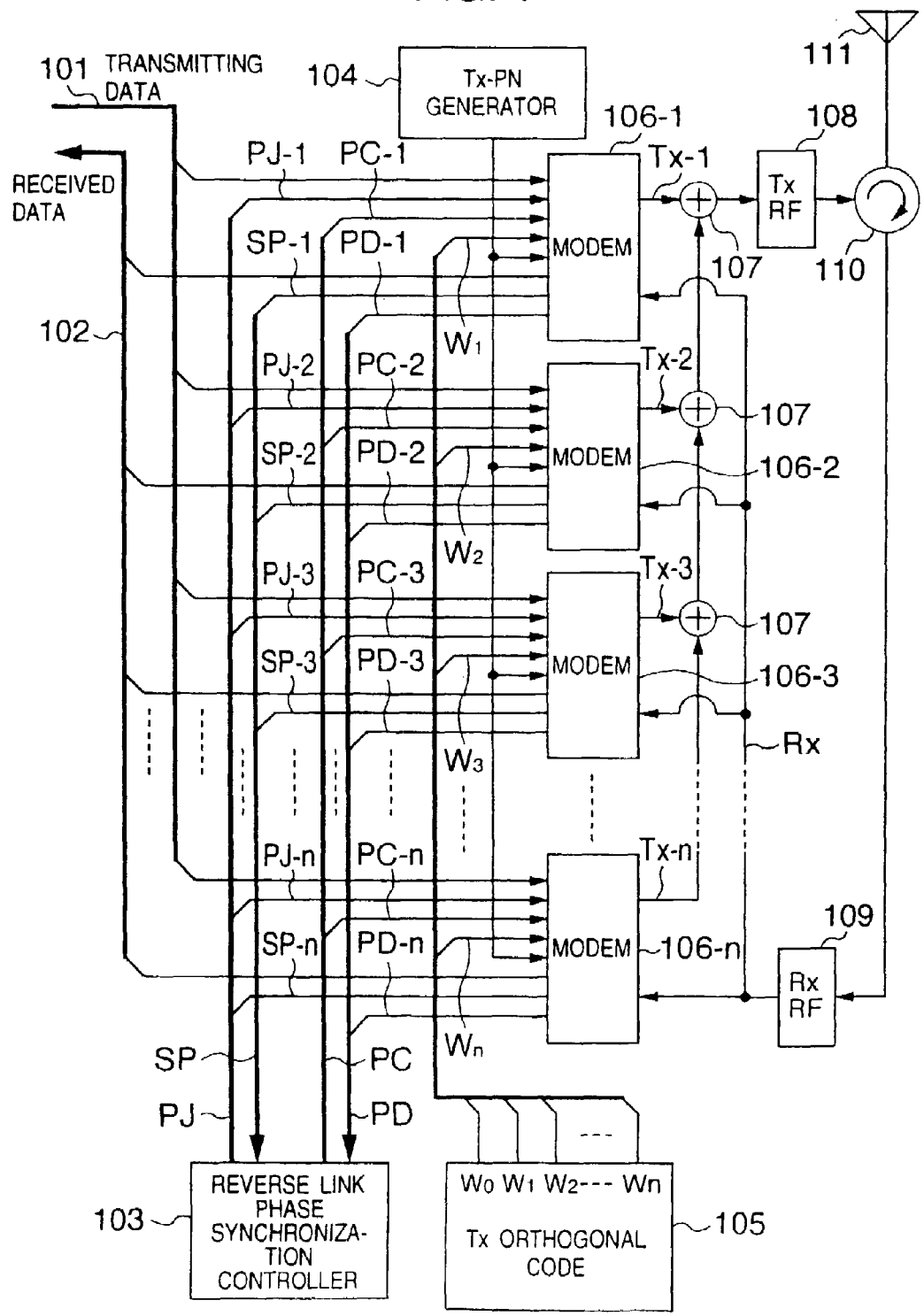
FIG. 1 is a block diagram showing a first embodiment of a base station constituting a communication system of this invention.

FIG. 1 shows the first embodiment of the structure of the base station 401. In the first embodiment, at the base station, a desired reception phase is set as a reference phase, and a transmission phase at each terminal station is adjusted to be equal to the reference phase.

A signal received at an antenna 111 is input via a circulator 110 to a radio frequency circuit 109 where the received signal is converted into a spectrum spread signal Rx on a baseband. The spread signal Rx is input to a plurality of modems 106-$i$ ($i$=1 to n) provided in correspondence with terminal stations under communications.

At each modem 106-$i$, the input signal Rx is demodulated through de-spreading and decoded to derive a transmitted signal (received data) of each terminal station. As will be later detailed with reference to FIG. 2, each modem 106-$i$ performs two steps of de-spreading by using pseudo noises PNr specific to each reverse link generated from a reception pseudo noise (PN) generator 211 and by using an orthogonal code Wi assigned to each terminal station and generated from an orthogonal code generator 212. Each modem 106-$i$ includes an acquisition circuit 214 which operates for timing acquisition of a spreading code (hereinafter called "an acquisition searching mode") and a received phase state decision circuit 213 which operates for phase tracking control after the timing acquisition (hereinafter called "a phase tracking control mode").

After the completion of the timing acquisition of a spreading code in the acquisition searching mode, the acquisition circuit 214 outputs acquired phase information SP-i ($i$=1 to n). In the phase tracking control mode, the decision circuit 213 compares the acquired phase while a de-spreading process for the received signal Rx is performed in parallel, and outputs phase difference information PD-i ($i$=1 to n).

The acquired phase information SP-i ($i$=1 to n) and phase difference information PD-i ($i$=1 to n) output from each modem 106-$i$ ($i$=1 to n) are input to a reverse link phase synchronization controller 103. In accordance with the contents of the acquired phase information SP-i ($i$=1 to n), the reverse link phase synchronization controller 103 generates phase jump information PJ-i ($i$=1 to n) of each terminal station, and in accordance with the contents of the phase difference information PD-i ($i$=1 to n) it generates a phase synchronization control instruction PC-i ($i$=1 to n) of each terminal station.

Transmitting data 101 to each terminal station is mixed by a corresponding modem 106-$i$ ($i$=1 to n) with the phase jump information PJ-i or phase synchronization control instruction PC-i of the terminal station selectively supplied from the reverse link phase synchronization controller 103, and subjected to an encoding processing and a modulating processing through spectrum spreading. This spectrum spreading is performed in two steps by using pseudo noises PNf specific to each forward link generated by a pseudo noise (Tx -PN) generator 104 and by using an orthogonal code Wi specific to each terminal station generated by an orthogonal code generator 105. The signal modulated through spectrum spreading is output as a transmitting signal Tx-i ($i$=1 to n).

Transmitting signals Tx-i ($i$=1 to n) of respective terminal stations are sequentially added by cascaded adders 107, and thereafter converted by a radio frequency circuit 108 into a signal on the transmission frequency band, and transmitted from the antenna 111 via the circulator 110.

Figure 2:
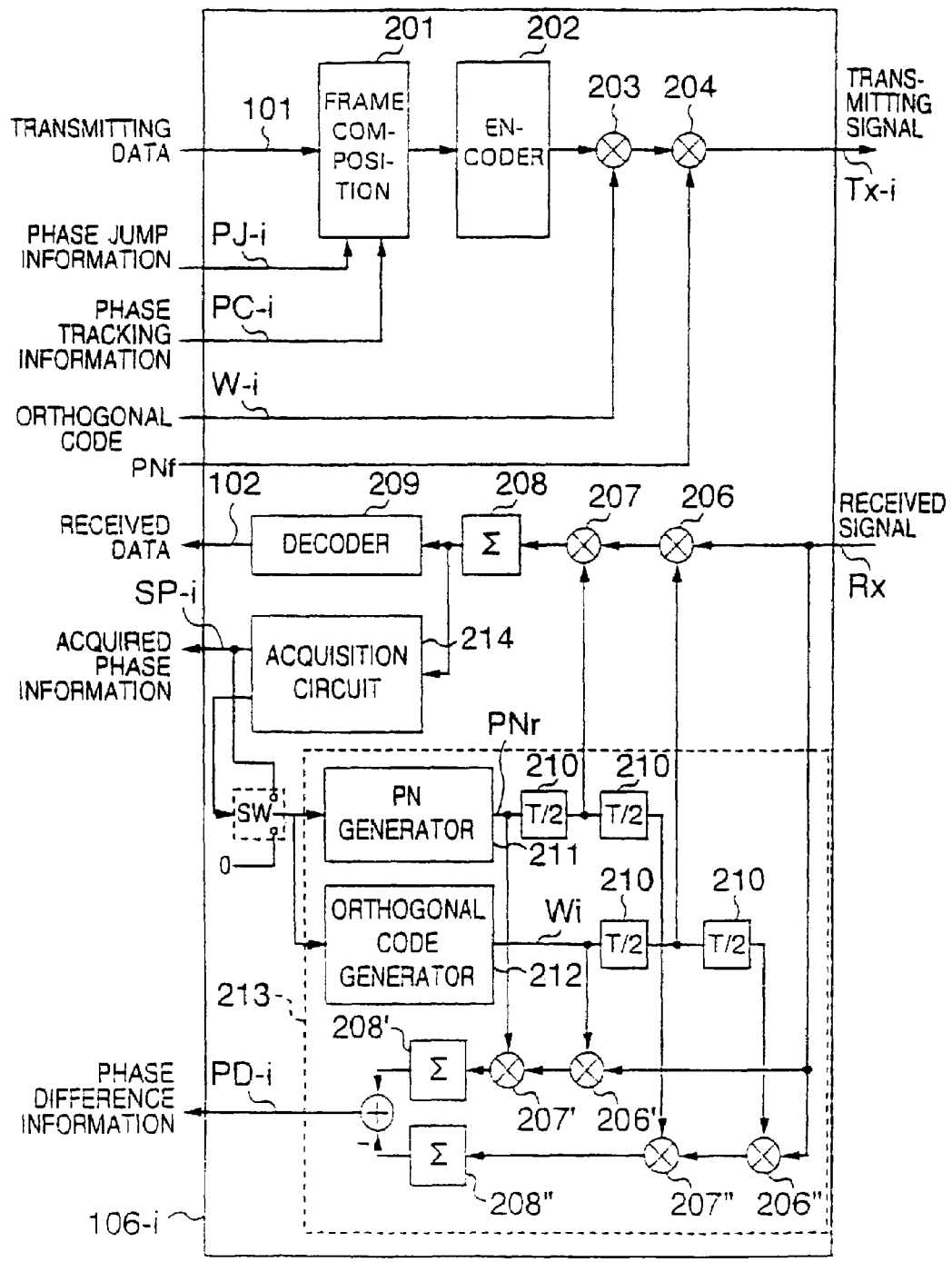
FIG. 2 is a block diagram showing the details of a modem 106-$i$ ($i$=1 to n) shown in FIG. 1.

FIG. 2 shows an example of the structure of the modem 106-$i$ ($i$=1 to n) shown in FIG. 1.

The transmitting data 101 and the phase jump information PJ-i ($i$=1 to n) or phase synchronization control instruction PC-i ($i$=1 to n) are mixed by a frame composition block 201, and thereafter encoded (including error correction and the like) by an encoder 202. The encoded signal is multiplied (first spectrum spreading processing) by the orthogonal code Wi assigned to the destination terminal station by a first multiplier 203, and then multiplied (second spectrum spreading processing) by the forward link pseudo noises PNf by a second multiplier 204. This spectrum spread signal is output as a transmitting signal Tx-i.

The received signal Rx is input to a first multiplier 206 to be multiplied (first spectrum de-spreading processing) by the orthogonal code Wi generated by the orthogonal code generator 212. The orthogonal code Wi is the same as the orthogonal code Wi used for spectrum spreading of the received signal Rx by the terminal station. An output of the multiplier 206 is input to a second multiplier 207 to be multiplied (second spectrum de-spreading processing) by the forward link pseudo noises PNf generated by the pseudo noise (PN) generator 211.

An output of the multiplier 207 is input to an accumulator 208 which accumulates outputs of the multiplier 207 during a predetermined period and outputs the accumulation results to a decoder 209 and the acquisition circuit 214. The signal accumulation period of the accumulator 208 is changed with the type of operation mode. For example, the accumulation period is an eight-symbol period for the acquisition searching mode, and a one-symbol period for the phase tracking control mode. On the assumption that data of consecutive (all) 1's is transmitted from a terminal station during the acquisition searching mode and the de-spreading results of the received signals are accumulated during the eight-symbol period at the base station, a gain of a correlation value can be increased by 9 dB so that the timing acquisition probability can be improved.

In an asynchronous state between the phases of the spreading code of the terminal station and that of the base station on the reverse link, i.e., in the acquisition searching mode, the acquisition circuit 214 decides synchronization based upon the results of the de-spreading outputs from the accumulator 208. During this period, a selection switch SW is turned to the acquisition circuit side so that a control signal output from the acquisition circuit 214 is input to the PN generator 211 and orthogonal code generator 212 of the received phase state decision circuit 213.

When it is determined from an output of the accumulator 208 that the phases of the spreading codes supplied to the multipliers 206 and 207 are asynchronous with the phase of the spreading code of the received signal Rx, the acquisition circuit 214 outputs a phase update instruction to the PN generator 211 and orthogonal code generator 212 in order to shift the phases thereof by a predetermined amount. If it is determined that the phases become synchronous, then the acquisition circuit 214 calculates a difference between the phases of the PN generator 211 and orthogonal code generator 212 at that time for the reference phase, and outputs the difference as acquired phase information which is notified to the terminal station. Data 102 output from the decoder 209 during the acquisition searching mode (during an asynchronous period) is processed as invalid data.

When it is determined that the spreading codes become synchronous, the acquisition circuit 214 makes the selection switch SW to be turned to a reference value generator side (in FIG. 2, this value is indicated as "0"). In this state, the phases of the PN generator 211 and orthogonal code generator 212 are set to the reference phase, and the circuit operation transits to the phase tracking control mode. During the phase tracking control mode, the de-spread received signal output from the accumulator 208 is subjected to a decoding processing such as an error correction processing by the decoder 209, and thereafter it is picked up as valid received data 102.

The received phase state decision circuit 213 surrounded by a broken line in FIG. 2 is used for determining the phase of the received signal Rx. The received signal Rx is subjected to a de-spreading processing by using spreading codes having a half-chip forwarded phase and a half-chip delayed phase relative to the phases of the spreading code (PN and orthogonal code) used by the multipliers 206 and 207 for de-spreading the received signal Rx. A difference between sums of respective de-spread results (correlation values) is output as the phase difference information PD-i.

In the decision circuit 213 shown in FIG. 2, outputs from the PN generator 211 and orthogonal code generator 212 are passed through respective cascaded half-chip delay circuits 210 of two stages, and spreading codes are generated having +/− half-pitch phases relative to the phase of the spreading code intermediate between the two delay circuits. The spreading code having a forwarded phase is supplied to multipliers 206' and 207' and the spreading code having a delayed phase is supplied to multipliers 206" and 207", thereby to be multiplied by the received signal Rx. The de-spread results of these two series of circuits are accumulated during a predetermined period by accumulators 208' and 208", similar to the accumulator 208 for the received data.

Figure 3:
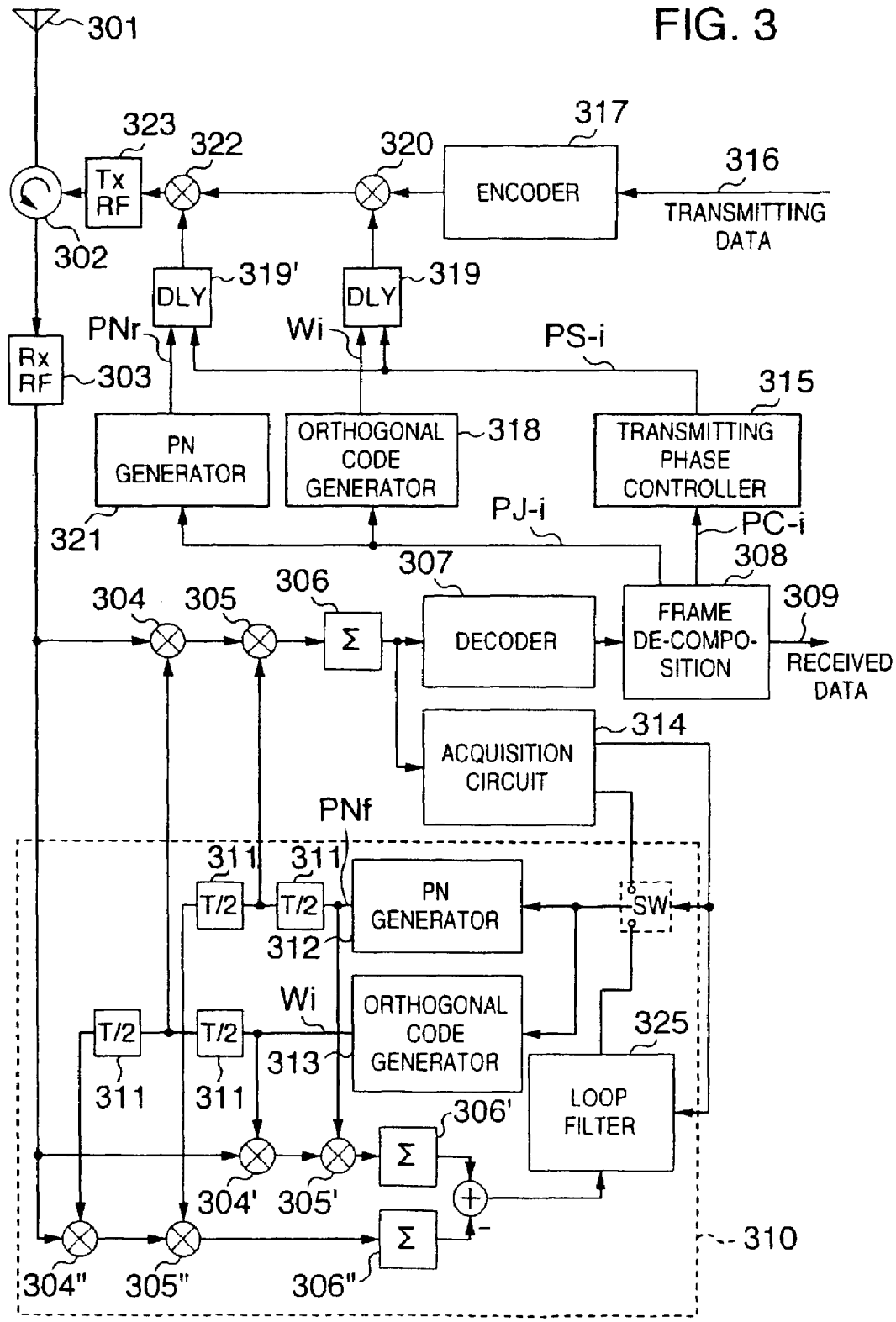
FIG. 3 is a block diagram showing a first embodiment of a terminal station of a communication system of this invention.

FIG. 3 shows an example of the structure of the terminal station 402.

A signal received at an antenna 301 is input via a circulator 302 to a radio frequency circuit 303 where it is converted into a spectrum spreading signal on the baseband. The spectrum spreading signal on the baseband is supplied to a first multiplier 304 of a reception circuit (demodulating circuit) to be multiplied (first de-spreading processing) by an orthogonal code Wi assigned to the terminal station and generated by an orthogonal code generator 313. An output of the first multiplier 304 is supplied to a second multiplier 305 to be multiplied (second de-spreading processing) by forward link pseudo noises PNf generated by a pseudo-noise (PN) generator 312. The PN generator 312 is set with noise patterns that are the same as the pseudo noises PNf specific to the forward link generated at the base station.

An output of the second multiplier 305 is input to an accumulator 306 which accumulates signals from the second multiplier 305 during a predetermined period. The accumulated signal is decoded (including error correction and the like) by a decoder 307 and supplied to a frame de-composition block 308.

The frame de-composition block 308 separates an output of the decoder 308 into received data 309, and phase jump signal PJ-i or phase synchronization control instruction PC-i. The phase jump signal PJ-i is input to an orthogonal code generator 318 and a pseudo noise generator 321 respectively of a transmission circuit (modulating circuit). In accordance with the contents of the phase jump signal PJ-i, the phases of the orthogonal code Wi and pseudo noises PNr used for spreading transmitting data, are coarsely adjusted. The phase synchronization control instruction PC-i is input to a transmission phase controller 315. In accordance with the contents of the phase synchronization control instruction PC-i, the transmission phase controller 315 outputs a control signal PS-i which is used for fine adjustment of the phases of the orthogonal code Wi and pseudo noises PNr.

Synchronization acquisition and tracking operations for PN and orthogonal code used by the de-spreading processing at the reception circuit are performed respectively by an acquisition circuit 314 and a DLL (Delay Lock Loop) circuit 310 surrounded by a broken line in FIG. 3. Similar to the received phase state decision circuit 213 of the base station, the DLL circuit 310 supplies the outputs of the PN generator 312 and orthogonal code generator 313 to half-chip delay circuits 311 of two stages to obtain spreading codes having half-chip forwarded and delayed phases relative to the spreading codes (PN and orthogonal code) used for the de-spreading of received data.

In an asynchronous state (in a timing acquisition state) of the phases between the received signal and de-spreading codes, the phases of the PN generator 312 and orthogonal code generator 313 are controlled by a phase updating instruction supplied from the acquisition circuit 314 via a switch SW. When the phase synchronization is acquired, the PN generator 312 and orthogonal code generator 313 are connected to a loop filter 325. In this state, the reception signal is de-spread by multipliers 304' and 305' with the spreading code having a half-chip forwarded phase and by multipliers 304" and 305" with the spreading code having a half-chip delayed phase. The phases of PN and orthogonal code are controlled so that the de-spread results of two forwarded and delayed phase series to be obtained by accumulators 306' and 306", become equal.

In the transmitting circuit, transmission data 316 is input to an encoder 317 to be encoded (including error correction and the like), and thereafter spectrum-spread by two multipliers 320 and 322. The first multiplier 320 multiplies the encoded transmitting data by the orthogonal code Wi assigned to the terminal station to perform a first spectrum-spread modulation. The next second multiplier 322 multiplies an output of the first multiplier 320 by reverse link pseudo noises PNr to perform a second spectrum-spread modulation. In this embodiment, the orthogonal code Wi generated by an orthogonal code generator 318 and pseudo noises PNr generated by a pseudo noise generator 321 are supplied via delay circuits 319 and 319' to the multipliers 320 322. The signal delay amounts at these delay circuits are controlled by the control signal PS-i output from the transmission phase controller 315 to thereby finely adjust the phases. An output signal of the second multiplier 322 is converted into a signal on a transmission frequency band by a radio frequency circuit 323 and transmitted from the antenna 301 via the circulator 302.

In the above embodiment, it is possible to synchronize at the base station the phase of a received signal from any terminal stations with each other, by the phase jump function to be performed when the acquisition searching mode transits to the phase tracking control mode at the base station and by the transmission phase control to be executed at each terminal station during the phase tracking control mode. Accordingly, the advantageous performance of orthogonal codes can be positively utilized and transmitting signals from terminal stations can be prevented from being interfered with each other.

As above, in the first embodiment, a desired reception phase is set as a reference phase by the base station, and the transmission phase of each terminal station is synchronized with this reference phase. After the synchronization acquisition, the phases of a PN generated by the reception PN generator 211 and an orthogonal code generated by the orthogonal generator 212, respectively shown in FIG. 2, are fixed to the reference phase set at the base station, and at this reference phase, de-spreading of the received signal is performed. For example, as the reference phase, the phases of the orthogonal code and PN at the base station for the forward link may be used.

Figure 4:
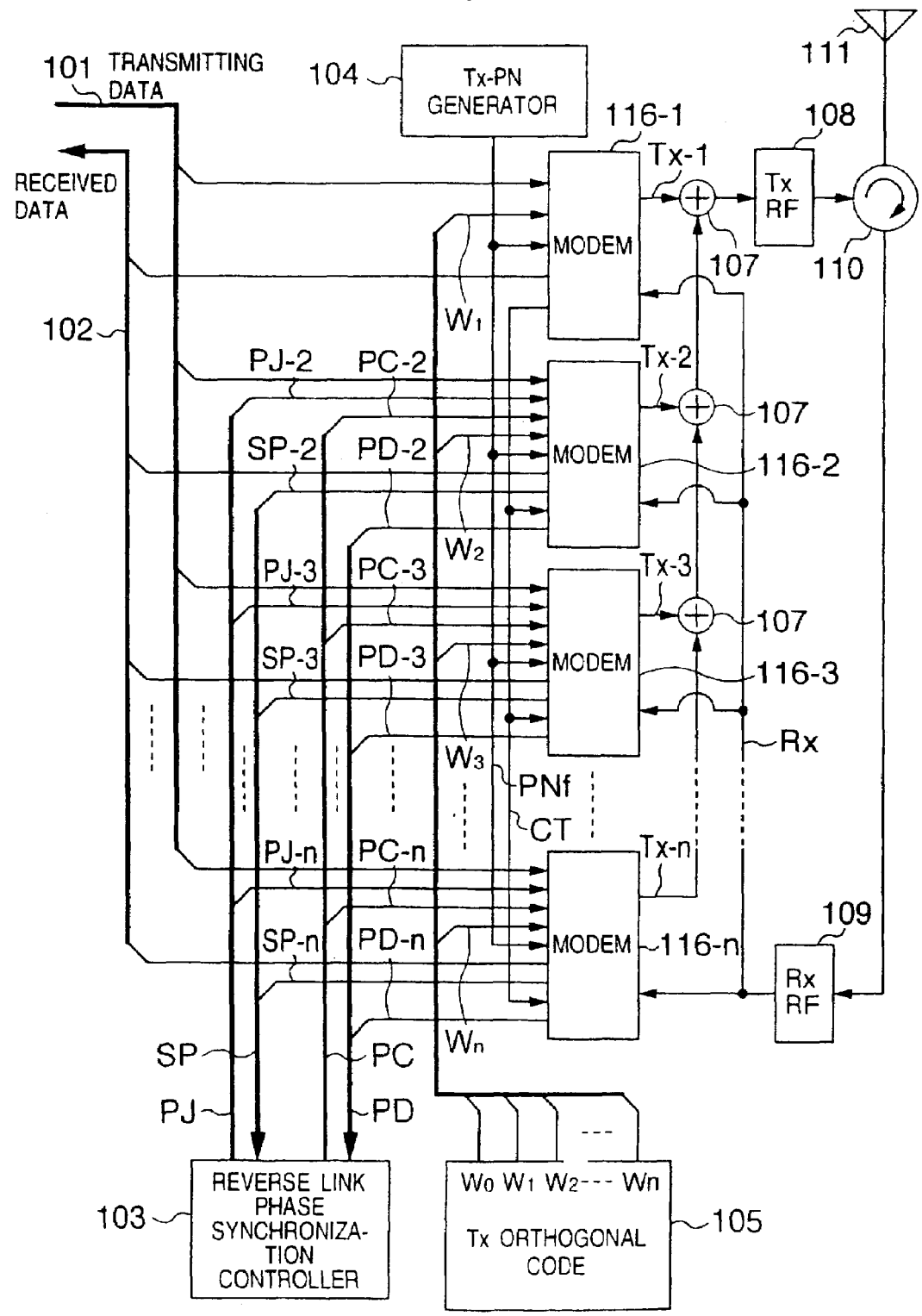
FIG. 4 is a block diagram showing a second embodiment of a base station constituting a communication system of this invention.

Next, the second embodiment of the invention will be described. FIG. 4 shows the structure of the base station 401. Constituent components corresponding to those shown in FIG. 1 are represented by identical reference numerals.

The structure and operation of the base station of the second embodiment are similar to those of the first embodiment. The point of difference is that the phase of a transmitting signal from a terminal station received at one of the modems (in this example, a first modem 116-1) is used as the reference phase to control the phases of transmitting signals from other terminal stations.

Referring to FIG. 4, the modem 116-1 has a DLL circuit and de-spreads a received signal while controlling the phases of the PN and orthogonal code so as to synchronize them with a received signal from the terminal station. In accordance with the phase of the PN and orthogonal code generated when the synchronization is acquired, the modem 116-1 generates spreading code synchronization timing information CT. In accordance with this information CT, the other modems 116-i (i=2 to n) set the reference phase of their reception spreading codes (PN and orthogonal code) to perform the de-spreading processing and received phase state decision during the phase tracking control mode.

Figure 5:
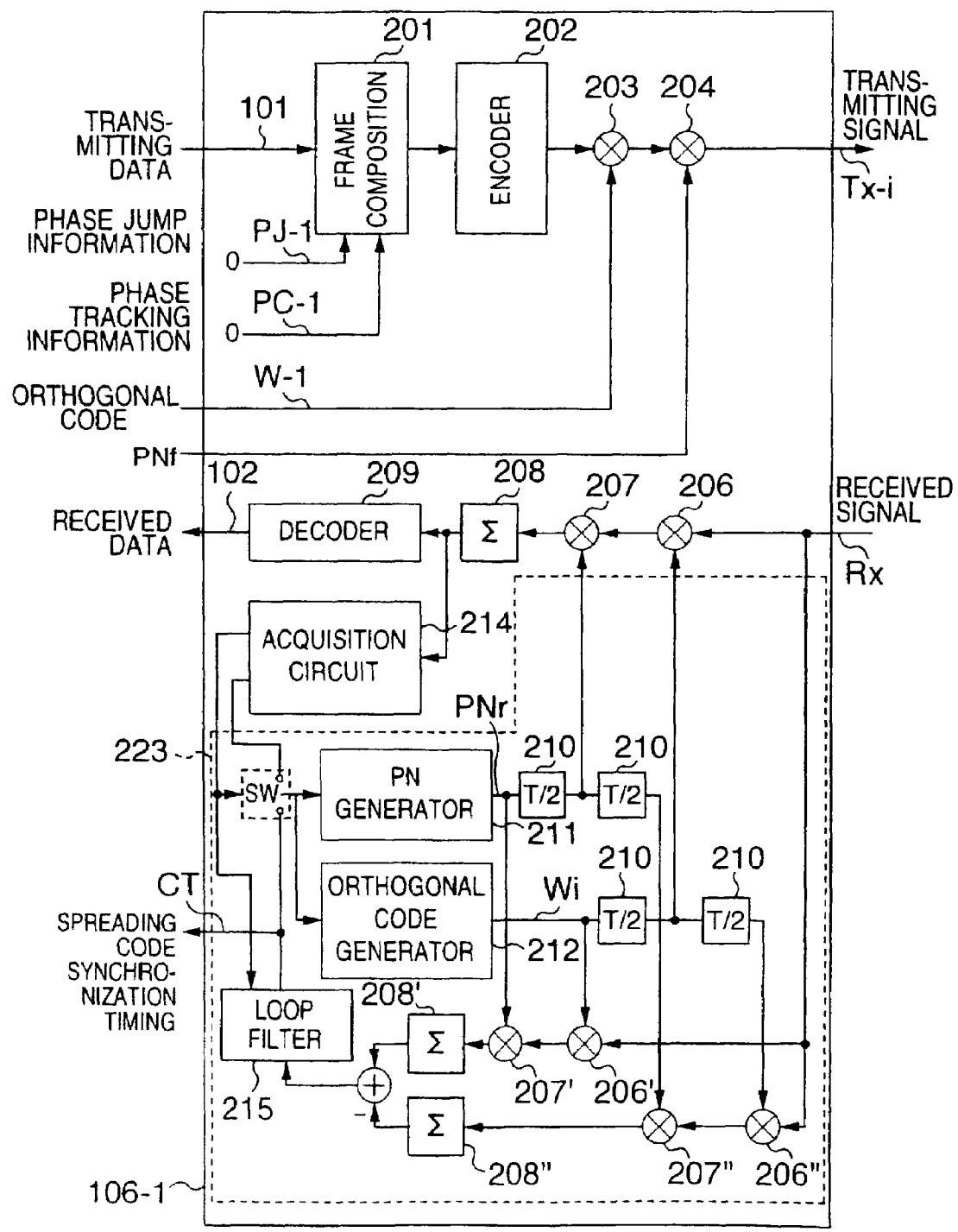
FIG. 5 is a block diagram showing the details of a modem 116-$i$ shown in FIG. 4.

FIG. 5 shows an example of the first modem 116-1 shown in FIG. 4.

The points of difference from the modem shown in FIG. 2 are that the phase control of the PN generator 211 and orthogonal code generator 212 to be executed by the reception phase state decision circuit 223 is performed by using the control signal from the acquisition circuit 214 similar to the DLL circuit 310 shown in FIG. 3 during the acquisition searching mode, and performed by a feedback control of an output of the loop filter 215 during the phase tracking control mode, and that in the transmission circuit, feedback of the phase synchronization control information to the terminal station is not performed but the values "0" are set to the phase jump signal PJ-1 and the phase control information PC-1 supplied to the terminal station.

The phase of a received signal when the acquisition circuit acquires a synchronization is set to the loop filter 215. By using this phase as a reference, the phases of the PN generator 211 and orthogonal code generator 212 are controlled through feedback. The phases of these generators are sent to the other modems 116-i (i=2 to n) as the spreading code synchronization timing information CT.

Figure 6:
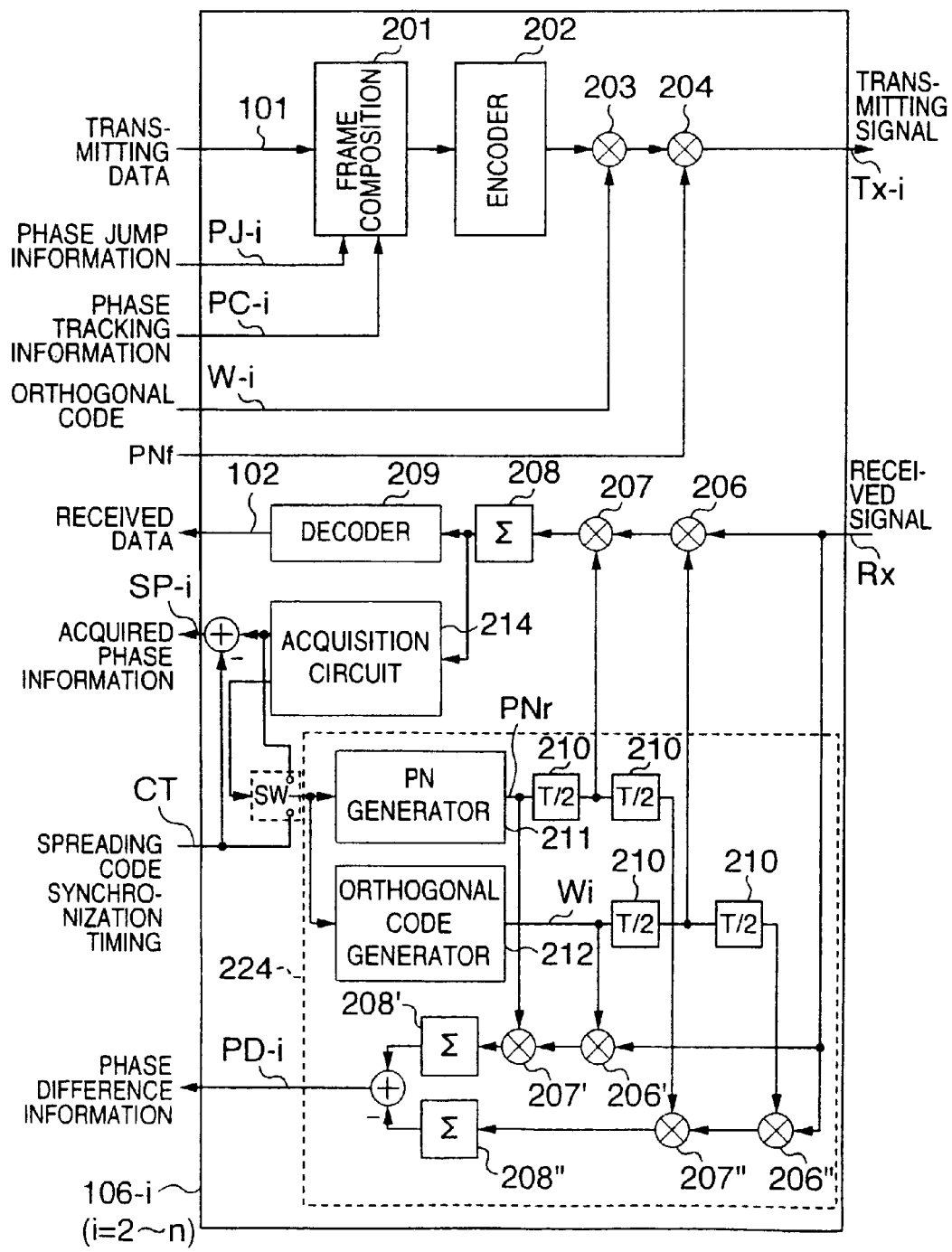
FIG. 6 is a block diagram showing the details of a modem 116-$i$ ($i$=2 to n) shown in FIG. 4.

FIG. 6 shows an example of the structure of the modem 116-i (i=2 to n) other than the first modem 116-1 shown in FIG. 4.

When the acquisition circuit 214 acquires synchronization during the acquisition searching mode, a difference between the current phases of the PN generator 211 and orthogonal code generator 212 and the reference phase indicated by the spreading code synchronization timing signal CT is used as the acquired phase information SP-i. After the synchronization acquisition, the PN generator 212 and orthogonal code generator 212 of the phase state decision circuit 224 execute the feedback control by using as the reference phase the phase represented by the spreading code synchronization timing signal CT. Different from the first modem 116-1, these other modems feed the acquired phase information SP-i and phase difference information PD-i back to the terminal stations as the phase jump information PJ-i and phase synchronization control information PC-i, respectively.

By using the above-described structure and control operation of the base station and by using as the reference phase the phase of a received signal from the terminal station corresponding to the first modem 116-1, synchronization control of received signals of the other terminal stations is executed.

Therefore, received signals of all terminal stations reach the base station in an orthogonal state with each other.

Next, the third embodiment of the invention will be described. In this embodiment, during the acquisition searching mode, the forward link phase of a spreading code on the terminal station side is changed to perform the timing acquisition of the spreading code. In the following description, it is assumed that the reference phase on a reverse link at the base station is equal to the forward link phase.

Figure 7:
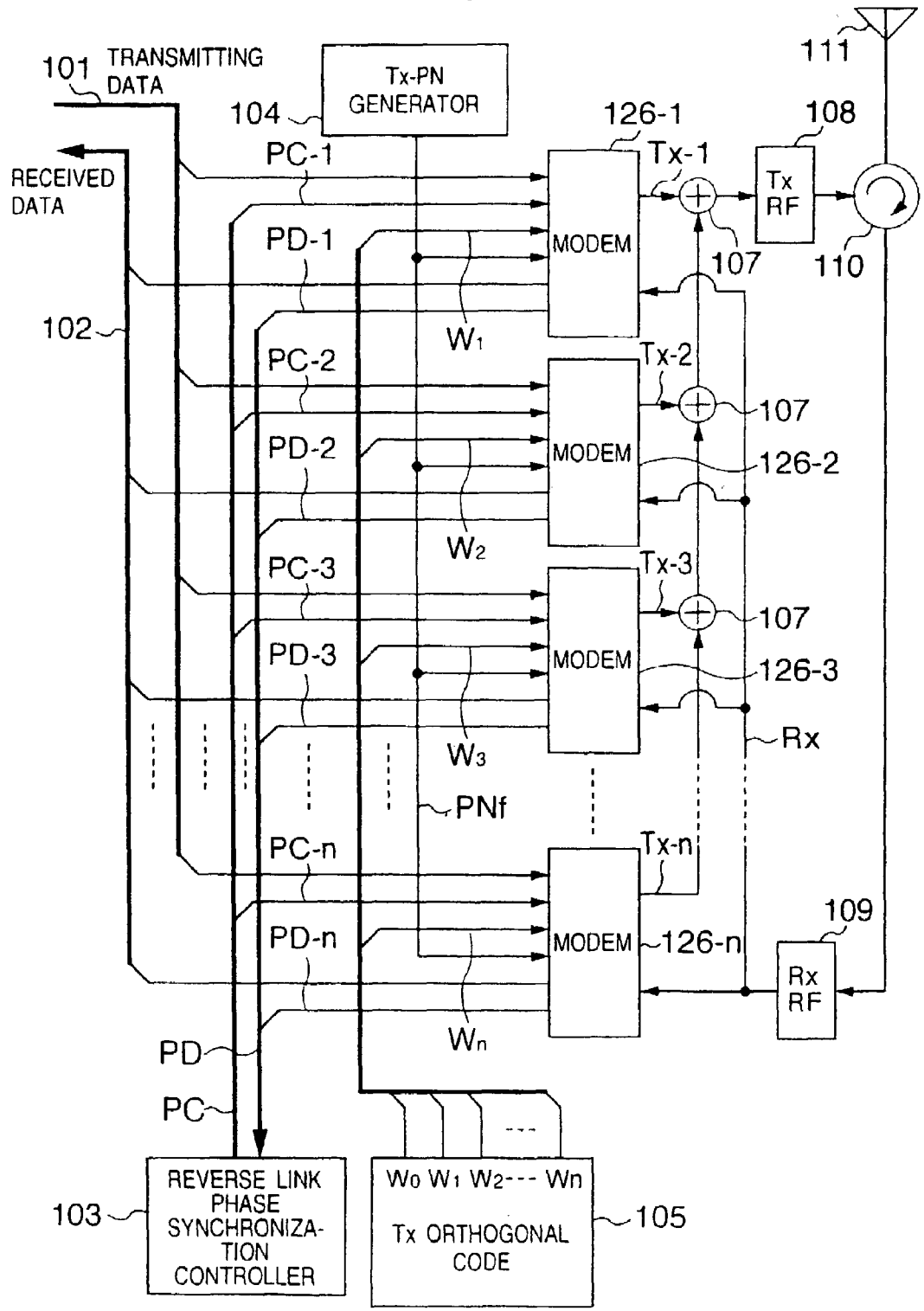
FIG. 7 is a block diagram showing a third embodiment of a base station constituting a communication system of this invention.

FIG. 7 shows the structure of the base station 401 according to the third embodiment of the invention. Constituent components corresponding to those of the first embodiment shown in FIG. 1 are represented by identical reference numerals.

The operation of the base station 401 during the phase tracking control mode is the same as the first embodiment, and the operation during the acquisition searching mode is different. In this embodiment, information supplied from each modem 116-$i$ ($i$=1 to n) to the reverse link phase synchronization controller 103 is only the phase difference information PD-$i$ ($i$=1 to n) generated during the acquisition searching mode. The acquisition searching control information SC-$i$ acquired during the acquisition searching mode is supplied, as shown in FIG. 8, directly to the frame composition block 201 in each modem 126-$i$.

Figure 8:
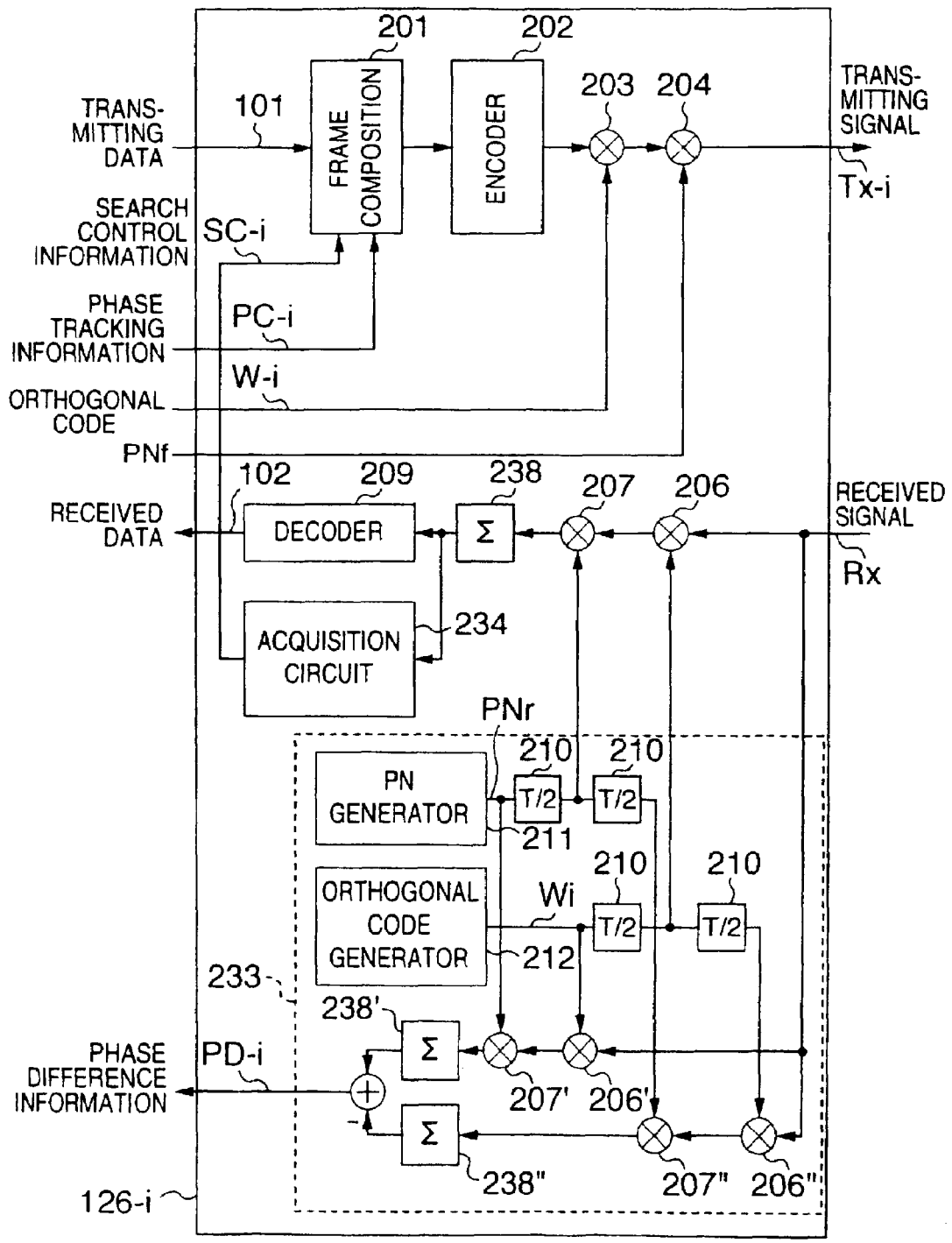
FIG. 8 is a block diagram showing the details of a modem 126-$i$ ($i$=1 to n) shown in FIG. 7.

FIG. 8 shows an example of the structure of the modem 126-$i$. As apparent from the comparison to FIG. 2, a received phase state decision circuit 233 of the modem 126-$i$ of this embodiment performs a de-spreading process of a received signal Rx by using always-fixed spreading codes (PN and pseudo noises) output from the PN generator 211 and orthogonal code generator 212, without receiving an external control signal. This is because each terminal station transmits a signal while changing the phase of the spreading code during the acquisition searching mode. The base station has no function of actively acquiring synchronization while changing the phase of the spreading code. The phase of a PN code PNr generated by the PN generator and the phase of an orthogonal code generated by the orthogonal code generator are both fixed to a predetermined reference phase. When a synchronization of the phase of the received signal Rx with the reference phase is acquired, the received data 102 is made valid.

Similar to the first embodiment, the accumulation period of an accumulator 238 inputted with de-spreading results of the received signals Rx is changed with the operation mode. For example, this period may be an eight-symbol period for the acquisition searching mode and a one-symbol period for the phase tracking control mode. In this embodiment, during the acquisition searching mode, the accumulator 238 discards the de-spreading results during a short period, e.g., one-symbol period, necessary for phase updating at the terminal station, and actually accumulates during the period of seven symbols. On the assumption that during the acquisition searching mode, data of consecutive (all) 1's is transmitted from a terminal station and the de-spreading results during the period in which seven symbols are accumulated without using the transmitted bits during the phase updating period, a gain of a correlation value can be increased by 8.5 dB so that a timing acquisition probability can be improved. The accumulation timing of the de-spreading results by the accumulator 238 is determined for each modem by taking into consideration a delay time for a signal transmitted from a terminal station to reach the base station.

During the acquisition searching mode, the de-spreading results of the received signal Rx are input to the acquisition circuit 234 to determine from the correlation value of the de-spreading results whether synchronization is acquired or not. The determination results are output as acquisition searching control information SC-$i$ ($i$=1 to n) to the frame composition block 201. The acquisition searching control information SC-$i$ is transmitted to the terminal station, as an acquisition searching mode termination notice signal when synchronization is acquired or as an acquisition searching mode continuation notice signal when synchronization is not acquired.

Figure 9:
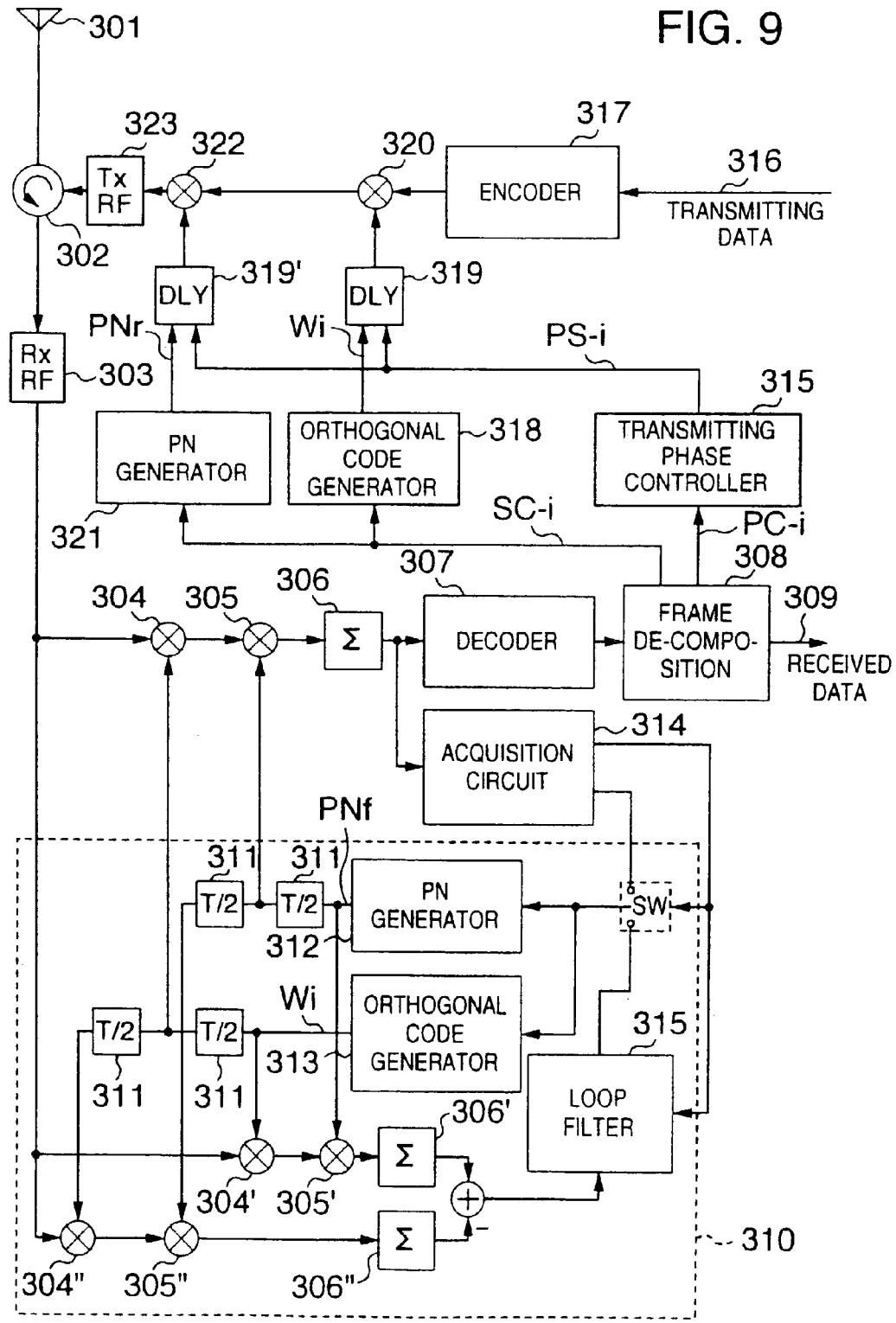
FIG. 9 is a block diagram showing a third embodiment of a terminal station constituting a communication system of this invention.

FIG. 9 shows an example of the structure of the terminal station 402 of the third embodiment. Constituent components corresponding to those of the first and second embodiments shown in FIG. 3 are represented by using identical reference numerals.

In this embodiment, the frame de-composition block 308 derives the acquisition searching control information SC-$i$ ($i$=1 to n) mixed with the reception data transmitted from the base station, and inputs it to the orthogonal code generator 318 and PN generator 321 of the transmission circuit. In accordance with the contents of the acquisition searching control information SC-$i$, the orthogonal code generator 318 and PN generator 321 control the phases of the orthogonal code Wi and PN code PNr. For example, while the acquisition searching control information SC-$i$ indicates a continuation of the acquisition searching mode, the phases of the orthogonal code Wi and PN code PNr are sequentially slid, for example, by a half-chip synchronously with the operation timing of the accumulator 306 of the reception circuit. Upon reception of the acquisition searching mode termination signal, the phases of the orthogonal code Wi and PN code PNr are slid back by an integer multiple of a half-chip at the next phase shift timing to thereby synchronize the phases with the phase of the inverse spreading code at the base station. This phase slide-back takes into consideration a phase slide of the spreading code at the base station during the delay time required for the acquisition searching mode termination signal to reach the terminal station after the synchronization decision at the base station. Immediately after the completion of the acquisition searching mode, the operation transfers to the phase tracking control mode to perform the phase tracking similar to the first and second embodiments.

According to the first to third embodiments described above, a signal of each channel on the forward and reverse links can be made orthogonal so that a signal of a subject channel with high quality can be received without being interfered with by other channels on both the terminal and base station sides. Since an orthogonal code is used for both the forward and reverse links, the number of terminal stations capable of communicating with the base station can be increased and terminal stations which are the same in number as the processing gain can be accommodated at a maximum.

If the invention is applied to a cellular mobile communication system, the phase control is performed during a period shorter than a change period of the communication conditions (such as fading or Doppler frequency shift) at the terminal station. In the above embodiments, although the same orthogonal code is assigned to each terminal station for both the forward and reverse links, different orthogonal codes may be assigned to the forward and reverse links.

Figure 12:
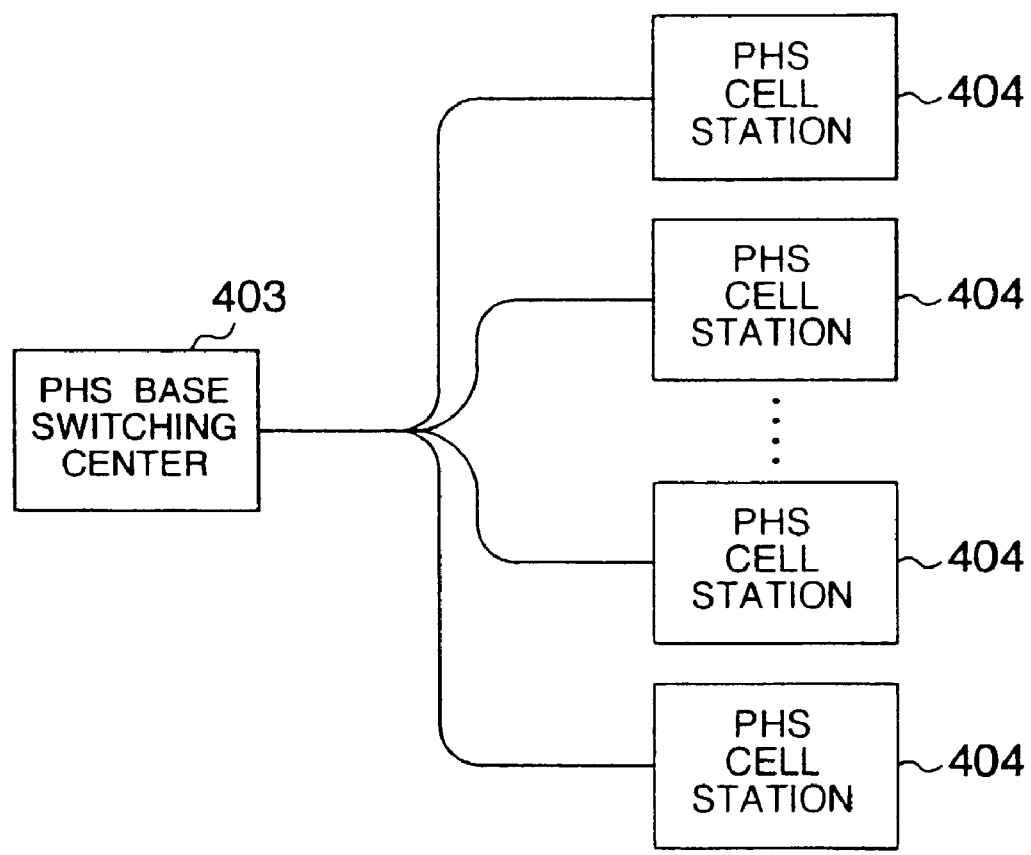
FIG. 12 is a diagram showing an example of another communication system to which the invention is applied.

In the above embodiments, the structures of the base and terminal stations have been described assuming that the invention is applied to the radio communication system shown in FIG. 10. The invention may be applied to other communication systems. For example, as shown in FIG. 12, the invention is applicable to a CDMA two-way communication system (CDMA/C system) in which a base switching center 403 and a plurality of cell stations 404 of a personal handyphone system (PHS) are interconnected by a CATV network. In this system shown in FIG. 12, the base switching center 403 corresponds to the base station 401, each cell station 404 corresponds to the terminal station 402, and the antenna 111 of the base station and the antenna 301 of the terminal station are replaced by a cable.

The invention may also be applied to other radio communication systems, for example, wireless local loop (WLL) systems in which base and terminal stations are installed at fixed locations.

It is to be understood that the above-described embodiments are merely illustrative of the principles of the invention and that many variations may be devised by those skilled in the art without departing from the spirit and scope of the invention. It is therefore intended that such variations be included within the scope of the claims.

What is claimed is:

1. A communication method in a communication system for performing communication between a base station and terminal stations, comprising the steps of:
   transmitting, from each terminal station, a first signal;
   performing, in the base station, a timing acquisition of the first signal from each terminal station and transmitting first difference information for coarse adjustment which indicates a phase difference between the first signal and a reference phase;
   generating, in each terminal station, an orthogonal signal having a phase set in accordance with the first difference information and transmitting a second signal using the generated orthogonal signal;
   performing, in the base station, a tracking of the second signal from each terminal station and transmitting a second difference information for fine adjustment between the second signal and the reference phase; and
   setting, in each terminal station, a delay amount of a delay circuit in accordance with the second difference information, wherein the delay circuit is between an antenna of each terminal station and a generator means for generating the orthogonal signal,
   wherein the first difference information is input to the generator means and the second difference information is input to the delay circuit.

2. The method of claim 1, wherein the second difference information is input to the delay circuit via a transmission phase controller.

3. A terminal station for performing communication with a base station, comprising:
   generator means for generating an orthogonal signal assigned to the terminal station and having a phase set in accordance with first difference information transmitted from the base station, wherein the first difference information indicates a phase difference for coarse adjustment between a reference phase and a first signal which is transmitted from each terminal station and received by the base station, said reference phase being used in a timing acquisition of the first signal; and
   a delay circuit, between an antenna and the generator means, having a delay set in accordance with second difference information transmitted from the base station, wherein the second difference information indicates a difference for fine adjustment during tracking between the reference phase and a second signal, transmitted from each terminal station using the orthogonal signal and received by the base station;
   wherein the first difference information is input to the generator means and the second difference information is input to the delay circuit.

4. The terminal station of claim 3, wherein the generator means is adapted to slide a phase of the orthogonal signal by a predetermined amount until receiving the first difference information transmitted from the base station, wherein the first difference information indicates a completion of timing acquisition of the transmitting signal from the terminal station.

5. The terminal station of claim 4, wherein the transmitting data are fixed as consecutive symbols before the completion of the timing acquisition.

6. The terminal station of claim 5, further comprising a transmission phase controller, wherein the second difference information is input to the delay circuit via said transmission phase controller.

7. The terminal station of claim 4, further comprising a transmission phase controller, wherein the second difference information is input to the delay circuit via said transmission phase controller.

8. The terminal station of claim 3, further comprising a transmission phase controller, wherein the second difference information is input to the delay circuit via said transmission phase controller.

* * * * *